(12) United States Patent
Novikov (10) Patent No.: US 7,012,518 B2
(45) Date of Patent: **\*Mar. 14, 2006**

(54) DIMMER CONTROL SYSTEM WITH TWO-WAY MASTER-REMOTE COMMUNICATION

(75) Inventor: Lenny M. Novikov, Fair Lawn, NJ (US)

(73) Assignee: Cooper Wiring Devices, Inc., Peachtree City, GA (US)

( \* ) Notice: Subject to any disclaimer, the term of this patent is extended or adjusted under 35 U.S.C. 154(b) by 200 days.

This patent is subject to a terminal disclaimer.

(21) Appl. No.: 10/703,335

(22) Filed: Nov. 7, 2003

(65) Prior Publication Data

US 2004/0207342 A1 Oct. 21, 2004

Related U.S. Application Data

(60) Provisional application No. 60/463,845, filed on Apr. 18, 2003.

(51) Int. Cl.
*G08B 1/08* (2006.01)

(52) U.S. Cl. ............... 340/538; 340/533; 340/531

(58) Field of Classification Search ......... 323/270, 323/271, 273; 340/534, 538, 531; 315/321, 315/324, 312

See application file for complete search history.

(56) References Cited

U.S. PATENT DOCUMENTS

| | | |
|---|---|---|
| 4,649,323 A | 3/1987 | Pearlman et al. |
| 4,689,547 A | 8/1987 | Rowen et al. |
| 4,833,339 A | 5/1989 | Luchaco et al. |
| 4,939,730 A * | 7/1990 | Tarver ............ 714/4 |
| RE33,504 E | 12/1990 | Yuhasz et al. |
| 5,017,837 A | 5/1991 | Hanna et al. |
| 5,153,816 A | 10/1992 | Griffin |

(Continued)

OTHER PUBLICATIONS

Lutron product brochure for "Maestro The High-Tech Multi-Location Dimmer", pp. 56-59.

(Continued)

*Primary Examiner*—Tuyet Thi Vo
(74) *Attorney, Agent, or Firm*—Ostrager Chong Flaherty & Broitman P.C.

(57) ABSTRACT

A dimmer control system has a communication control loop that connects a master unit in series with a plurality of remote units, and it is superimposed in series on the dimmer load line so as to allow two-way communication between the master unit and remote units without affecting the operation of the load. Communications from the master to the remote units are encoded in loop current fluctuations, whereas communications from any remote to the master unit are encoded in loop voltage fluctuations. The master unit has a switched power supply, for use during normal LOAD ON operation, in tandem with a capacitive power supply, for use during LOAD OFF operation of the control units so as to minimize hum. The master unit power supply circuit provides an output rail voltage comprised of a reference voltage for the load superimposed with a control loop voltage for the voltage drop across the series-connected remote units. The master unit has a POWER OFF detection circuit and a non-volatile memory for storing system status information, so that when power is restored, the system can be restored to its former power level. The switch units are formed with a cover frame mounting a switch plate on a hinge axis allowing ON/OFF movement of an opposing side thereof. An array of LED light pipes is mounted in the switch plate aligned with the hinge axis, in order to minimize displacement of the light pipes during actuator movement.

28 Claims, 7 Drawing Sheets

U.S. PATENT DOCUMENTS

| | | | |
|---|---|---|---|
| 5,212,478 | A | 5/1993 | Moseley |
| 5,248,919 | A | 9/1993 | Hanna et al. |
| 5,336,979 | A | 8/1994 | Watson et al. |
| 5,399,940 | A | 3/1995 | Hanna et al. |
| 5,589,741 | A * | 12/1996 | Terman et al. .............. 315/360 |
| 5,798,581 | A | 8/1998 | Keagy et al. |
| 6,091,205 | A | 7/2000 | Newman, Jr. et al. |
| RE38,069 | E | 4/2003 | Posa |
| 6,545,434 | B1 | 4/2003 | Sembhi et al. |
| 2003/0020606 | A1 * | 1/2003 | Pan ........................... 340/531 |

OTHER PUBLICATIONS

Lutron product brochure for "FAEDRA Smart Dimmer—For Standard Wallplate", Lutron Electronics Co., Inc. (2002).

Lutron Ordering Guide for "FAEDRA Smart Dimmer—For Standard Wallplate", Lutron Electronics Co., Inc. (2002).

Product Specification Sheets for Onset Low-Wattage Incandescent Dimmer, Lightolier Controls (1997).

Ordering Guide for ONSET digital dimmers and controls, pp. 10-11, Lightolier Control (1997).

Product Specification Sheet for ONSET Channel Remote, Lightolier Controls (1997).

Product Brochure for The Mural Collection, Leviton Manufacturing Co., Inc. (2000).

Product Specifications for Mural Lighting Controls, Leviton Manufacturing Co., Inc. (1999).

Product Specifications for Mural Level Set (L/S) Lighting Controls, Leviton Manufacturing Co., Inc. (2000).

Installation and Operating Instructions for IMPRESSIONS 3-Key Incandescent Touch Dimmers, Pass & Seymour, May 1992.

IMPRESSIONS Electrical Wiring Devices and Accessories, Pass & Seymour, Apr. 1991.

Catalog for LEVITON Wiring Devices for Construction and Maintenance, Leviton Manufacturing Co., Inc.(2000).

LUTRON Residential Lighting Controls Catalog, pp. 70-73, Lutron Electronics Co., Inc. (2001).

* cited by examiner

DIMMER CONTROL SYSTEM WITH TWO-WAY MASTER-REMOTE COMMUNICATION

CROSS REFERENCE TO RELATED APPLICATIONS

This application claims the benefit of U.S. Provisional Patent Application No. 60/463,845 filed Apr. 18, 2003, the disclosure of which is incorporated herein by reference.

TECHNICAL FIELD

This invention generally relates to a light dimmer control system, and more particularly, to a dimmer control system employing a master unit in communication with one or more remote units.

BACKGROUND OF INVENTION

Dimmer lighting and control systems are widely used in indoor lighting to provide a softer feel and more controllable illumination experience as compared to on/off lighting. Prior dimmer lighting systems have employed dimmer switch controls that include an on/off switch and an up/down power control, master unit and remote units, and microprocessor control for various power-up, power-down and fade in/out functions. Rather than use a variable resistor type rheostat which wastes power and generates heat at low illumination levels, modern dimming systems employ phase regulation, in which the power circuit is switched on at a time delay following a zero-crossing of the AC sine wave input until the end of each half cycle in order to supply a variable level of power to the lighting load.

However, prior multi-location dimmer control systems have various shortcomings and problems in operation. In systems that employ master and remote units, the remote units are "dumb" boxes that simply have on/off and up/down switches but do not indicate the lighting status of the system. Attempts to provide two-way communication functions between the master and remote units would impose added costs and difficulties in outfitting the remote units with power sources and the capability to communicate with the master unit.

Figure 5:
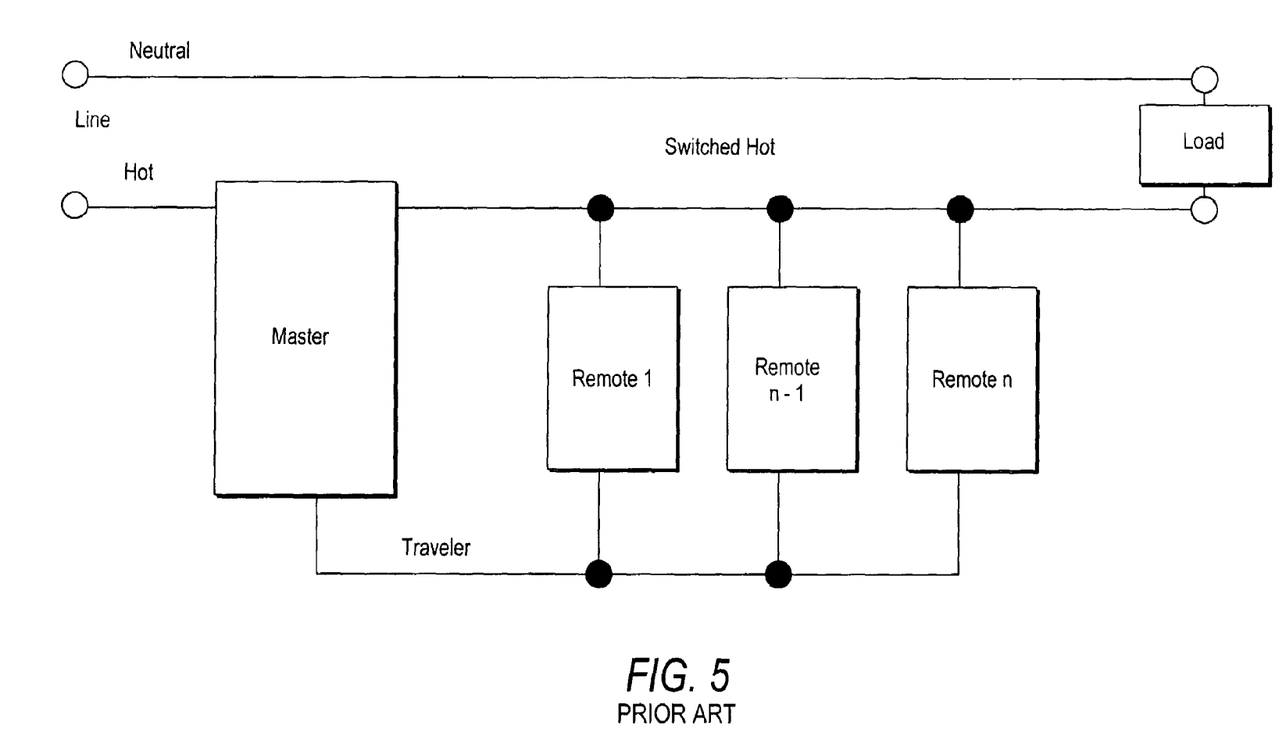
FIG. 5 is a schematic diagram of a prior art dimmer control system showing a master unit connected in parallel with a number of remote units which do not have the capability to communicate with the master unit or to show the lighting level.

For example, a typical prior art multi-location dimmer (shown in FIG. 5) consists of a fully functional master unit and a number of remote units (1, . . . n), where the remote units are connected in parallel with each other between a "switched hot" line of the master unit and a "Traveler" or "Control" line of the master unit. The remote units communicate to the master unit by sending a portion of the output current on the Traveler line to the control input of the master unit. To transmit three commands (Up, Down, and Toggle On/Off), positive, negative and alternating waveforms are used. These remote units require no power in normal operation, and cannot display the level of light setting. To display the light setting level, the remote units would require power and two-way communication means. The task of supplying power to the remote units is quite complicated, as every remote would need some current to operate. With the remote units connected in parallel, total current drawn from the control terminal of the master unit unit would be proportional to the number of remote units connected to the system. When this current reaches a certain level, the lamp load may start glowing (showing illumination) when it is supposed to be in the Off condition. Also the power supply size needed would increase in proportion to the maximum number of remote units that could be connected to the system.

For a multi-location dimmer that supplies power to the remote units, there may be a problem that the internal dimmer's power supply could create an audible noise in the load when the load is Off, which otherwise would be masked when the load is On. This power supply may also generate waste heat.

It is also known in prior dimmer control systems to use control memory to restore the illumination level to the same level as when it was last powered off, as a user often sets the illumination level to a desired comfort level and wants the same level when turning the light system back on again. However, the use of a separate latch device is limited to memorizing only whether the load was on or off, and the use of ongoing memory storage of the current power level requires use of a memory component capable of extremely high usage of read/write cycles, which imposes an added cost.

SUMMARY OF INVENTION

In accordance with the present invention, a dimmer control system is provided with a communication control loop that connects a master unit in series with the source and the load, and a plurality of remote units in series with each other between the "Switched Hot" line and the "Traveler" or "Control" line of the master unit, and the communication control loop is superimposed on the dimmer load line in a manner that allows two-way communication between the master unit and the remote units without any effect from the dimmer load current on the communication. Communication messages from the master unit to the remote units are encoded in loop current fluctuations that are decoded by the remote units, and communication messages from any remote to the master unit are encoded in loop voltage fluctuations that are decoded by the master unit.

In a preferred embodiment of the invention, the communication control loop connects the master unit's control circuit in series with the respective remote units so as to minimize the current requirements and the required power supply size. The master unit uses a switched power supply during normal operation. The communication loop is hosted and synchronized by the master unit, and the communication messages are transmitted close to the timing of the input line voltage zero crossings, i.e., at the beginning of each half-cycle of input line voltage. The master unit's power circuit provides an output rail voltage equal to the sum of the total control loop voltage drop attributable to the series-connected control circuits of the remote units and a fixed reference voltage. The reference voltage for the power supply is tied to the control loop voltage drop, thus generating minimum heat regardless of the number of remote units in the loop.

As a further aspect of the present invention, the master unit's power circuit maintains its switched power supply in tandem with a capacitive power supply. The switched power supply is used during normal LOAD ON conditions, whereas the capacitive power supply is used to continue to supply power to the system during LOAD OFF conditions, when the switched power supply is switched off in order to avoid acoustic noise (hum) in the load. The switched power supply with floating reference voltage powers the system during normal LOAD ON conditions in order to avoid the heat generation that would be incurred by otherwise using a capacitive power supply.

As another aspect of the invention, the master unit's control circuit includes a non-volatile memory that is written with system status information when a POWER OFF condition is detected. When a POWER ON condition is restored, the stored system status information is used to restore the operation of the dimmer control system to where it was before the POWER OFF condition. In the preferred embodiment, a POWER OFF condition (power interruption) is detected when two consecutive zero crossings are not detected by the microprocessor, and the system status information temporarily stored in its RAM is recorded in the non-volatile memory, using the energy accumulated in a reservoir capacitor to power the recording process.

As yet another aspect of the invention, the master and remote units have a physical configuration in which an ON/OFF switch component is hinged for slight actuator ON/OFF movement on a hinge axis along one lateral side of the unit's frame, and a system status display is formed by an array of light indicators comprising a row of indicator lenses arranged in the surface of the ON/OFF switch component and aligned in close proximity in parallel with the hinge axis and optically connected by light pipes to respective LEDs on the control unit's control circuit board, wherein any slight displacement of the light pipes caused by actuator movement of the ON/OFF switch component can be minimized to avoid light fluctuations in the display of the indicator lenses.

Other objects, features, and advantages of the present invention will be explained in the following detailed description of the invention having reference to the appended drawings.

DETAILED DESCRIPTION OF INVENTION

A preferred embodiment of the invention is herein described in detail, and is sometimes referred to as the "Smart Dimmer" system. It is to be understood that while a particular system configuration, circuit layouts, and modes of operation are described, other modifications and variations may be made thereto in accordance with the general principles of the invention disclosed herein.

Figure 7A:
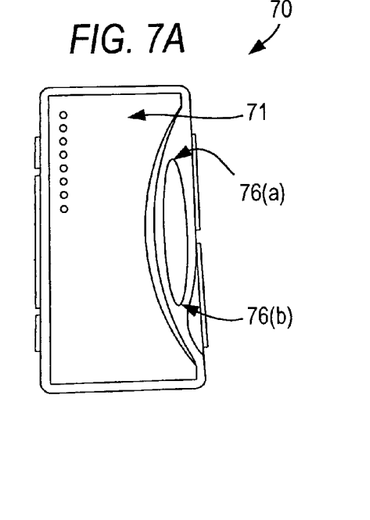
FIGS. 7A to 7D show a preferred structure for the master and remote units having an array of light pipe lenses displayed on a large ON/OFF actuator switch.
Figure 7B:
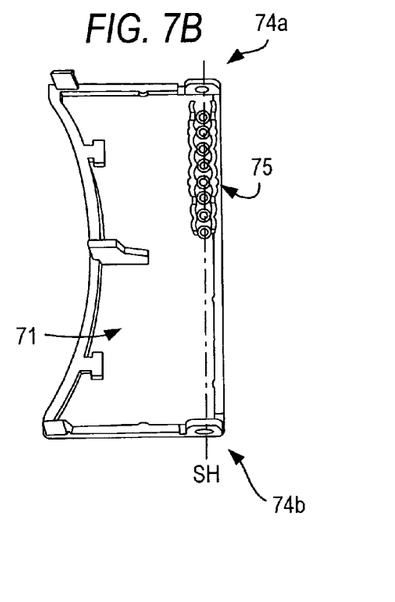
Figure 7C:
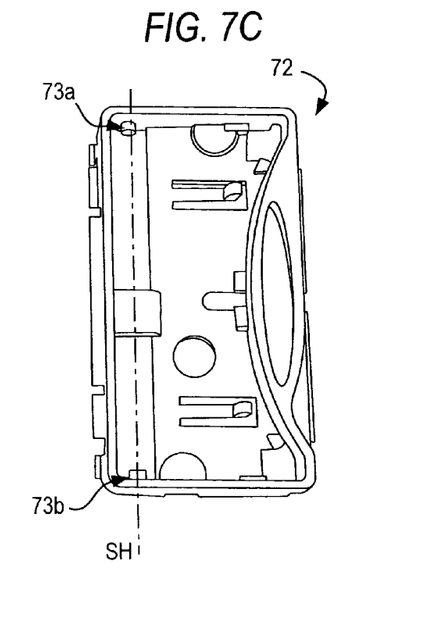
Figure 7D:
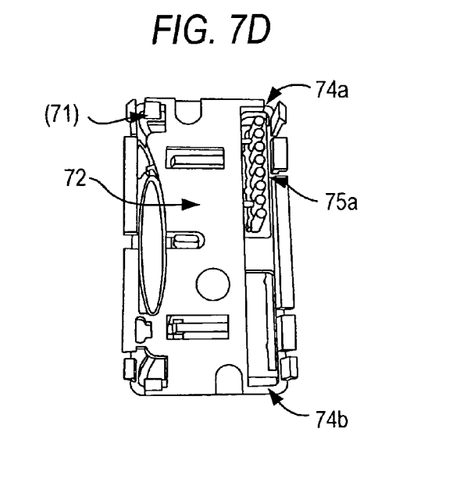

The Smart Dimmer is a wall-mounted, electronic system for controlling the level of power delivered to a load, such as a light, lamp or fan, thereby also controlling the load's output (e.g., light intensity). The Smart Dimmer system may be installed with one "master unit" alone or in combination with one or more "remote units" each having a bottom housing for holding all of the electronic components and a cover including a frame portion on actuator switches for actuating the ON/OFF or dimming functions. Referring to FIG. 7A, a preferred design for the cover 70 of the master and remote units is shown. The cover 70 includes a frame portion 72, shown separately in FIG. 7C, to which a large actuator switch plate 71 is mounted for push-button type ON/OFF movement against a spring force (not shown). The back side of the large actuator switch plate 71 is shown in FIG. 7B, and the back side of the frame portion 72 with the switch plate 71 mounted therein is shown in FIG. 7D. A rocker-type dimmer switch 76 projects through an oval aperture in the frame portion 72 and has ends 76(a) and 76(b) which are coupled to UP and DOWN switches on the control board in the bottom housing (not shown).

The switch unit's frame portion 72 has a pair of spaced-apart switch hinge pins 73a and 73b formed on opposing ends of the frame portion 72 to form a switch hinge axis SH in proximity to one longitudinal side of the frame portion 72. Each of the switch hinge pins 73a and 73b, respectively, snap fits into recesses 74a and 74b formed on the back side of opposing ends of the large actuator switch plate 71 to form a switch hinge axis SH in proximity to one longitudinal side of the large actuator switch plate 71, allowing the opposing side of the switch plate 71 (formed with a concave shape) to be depressed against a spring force for toggling ON/OFF. An array of openings (or lenses) 75 also aligned with the switch hinge axis SH are formed in the large actuator switch plate 71 for terminating a series of light pipes 75a optically connecting the lighting level indicator LEDs on the control circuit board for the unit located in the bottom housing behind the cover 70. The alignment of the LED light pipe array 75 with the switch hinge axis SH ensures that there is only minimal displacement of the light pipe ends from the LED light sources when the large actuator switch plate 71 is depressed, thereby minimizing any illumination fluctuations in the external light indicator array. Once the light pipes 75a are attached to the large actuator switch plate 71, they become integral with it. This arrangement of fixing the light pipes 75a to the large actuator switch plate 71 along its switch hinge axis SH avoids problems related to having to provide clearance holes for the light pipes in the large actuator switch plate if the light pipes were otherwise fixed to the frame portion or other non-moving component. Placing the lighting level illumination display on the switch plate 71 allows the user to find and be guided to the operative part of the switch plate in low light conditions and provides an aesthetic feature to the overall system design.

The microprocessor-based control circuit controls the level of power delivered to the load in response to input signals generated by a user's actuation of the ON/OFF and UP/DOWN dimmer switches. For example, the device can be used to fade the load ON and OFF, to increase (brighten) or decrease (dim) power delivered to the load, and to perform certain other fade functions, all depending on a user's input. The Smart Dimmer's ON/OFF switch is actuated by one short-duration push of the button (i.e., one tap) or by holding the button down for at least two (2) seconds. The UP/DOWN dimmer switch is actuated by pushing the respective ends of the rocker switch. Each of these actuations results in a different fade function depending on the state of the power level delivered to the load when the actuation occurs. Further, actuation of the UP/DOWN dimmer switch when the load is Off results in a setting of the desired power level to be supplied to the load when the ON/OFF switch is actuated. That is, when the load is Off, the UP/DOWN dimmer switch cannot be used to turn the load On.

The vertical series of apertures or lenses for the light emitting diodes (LED), preferably eight (8) in number, are provided on the Smart Dimmer's switch plate to indicate the desired load power or intensity level to the user at all times. For example, the bottom LED is yellow and the remaining LEDs are green. Only two (2) of the LEDs (the yellow and one green) are illuminated at any one time, such that the yellow LED is a frame of reference and the green LED shows the present power level in relation to the yellow LED. In one preferred embodiment, when a user instructs the Smart Dimmer to apply power to the load, the activated LEDs are both fully illuminated and when a user instructs the Smart Dimmer to remove power from the load, the activated LEDs are both dimmed. Alternatively, the LEDs may remain at a constant brightness, or the LEDs can be caused to change color to indicate when the power delivered to the load should be ON or OFF.

The LEDs of the Smart Dimmer system are not operated directly by the power supply. The Smart Dimmer system also does not incorporate any direct means to sense the load status. The LED brightness or color change is a function of the software operation in response to user actuation, not affected by either the power supply or the actual load status. It is supposed to indicate the desired load status to the user, but has no direct means to tell if the load is actually energized.

Dimmer Control System

Figure 1:
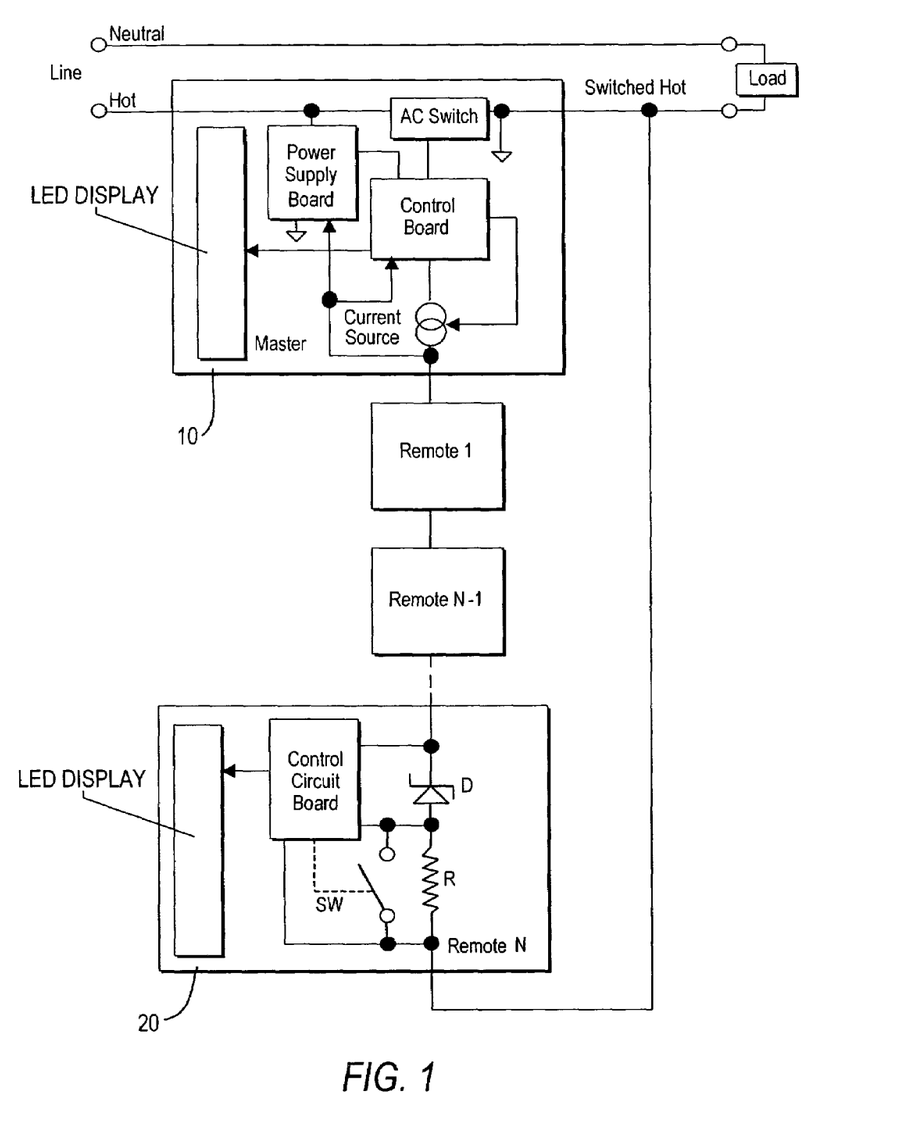
FIG. 1 is a schematic diagram of a dimmer control system in accordance with the present invention, in which a communication loop connects a master unit in series with a number of remote units and is superimposed with a load line supplying power to a load.

As shown in FIG. 1, the dimmer control system is provided with a communication control loop that connects the master unit 10 in series with a plurality of remote units (1, . . . n) labeled with reference numeral 20. The master unit has an LED Display for indicating the lighting status of the system, and a Power Board connected to a Control Board for phase controlling of an "AC Switch" positioned between the "hot" side of the dimmer load line and the "switched hot" side, which is connected to the Load. The master unit's Control Board also controls a Current Source to the series loop through the remote units. Each remote unit 20 also has an LED Display to indicate the lighting status of the system, and a Control Circuit Board for handling user inputs to the remote and the two-way communication functions with the Master Unit. The return line from the remote units is connected to the output terminal of the master unit ("Switched Hot" terminal). The series loop enables two-way communication between the master unit and the remote units without affecting the operation of the dimmer load line. As described in further detail below, communication messages from the master unit to the remote units are encoded in loop current fluctuations that are decoded by the remote units, and communication messages from any remote to the master unit are encoded in loop voltage fluctuations, which are decoded by the master unit. The use of separate encoding schemes allows the one series loop to be used for the communication function without confusion between the Master and remote units and without needing complex communications procedures.

Circuit Operation: Control Board and Power Board

The Power Supply of the Master Unit generates DC rail voltage from the input AC sufficient to power the master unit's Control Board, Current Source and a number of remote units connected in series between the output of the Current Source and the Switched Hot output of the master unit. The Current Source generates DC current that flows through the master unit's Control Board and the remote units in the loop. This current generates voltage for the corresponding circuit operation in every remote and the master unit's Control Board. The total voltage drop across all the remote units in the loop is sensed by the Power Supply, and the rail voltage is self-adjusted accordingly. The use of n remote units in serial connection simplifies the Power Supply design and reduces the amount of heat generated by the circuit. The "current source" arrangement makes the communication loop virtually insensitive to ripple and noise.

Figure 2:
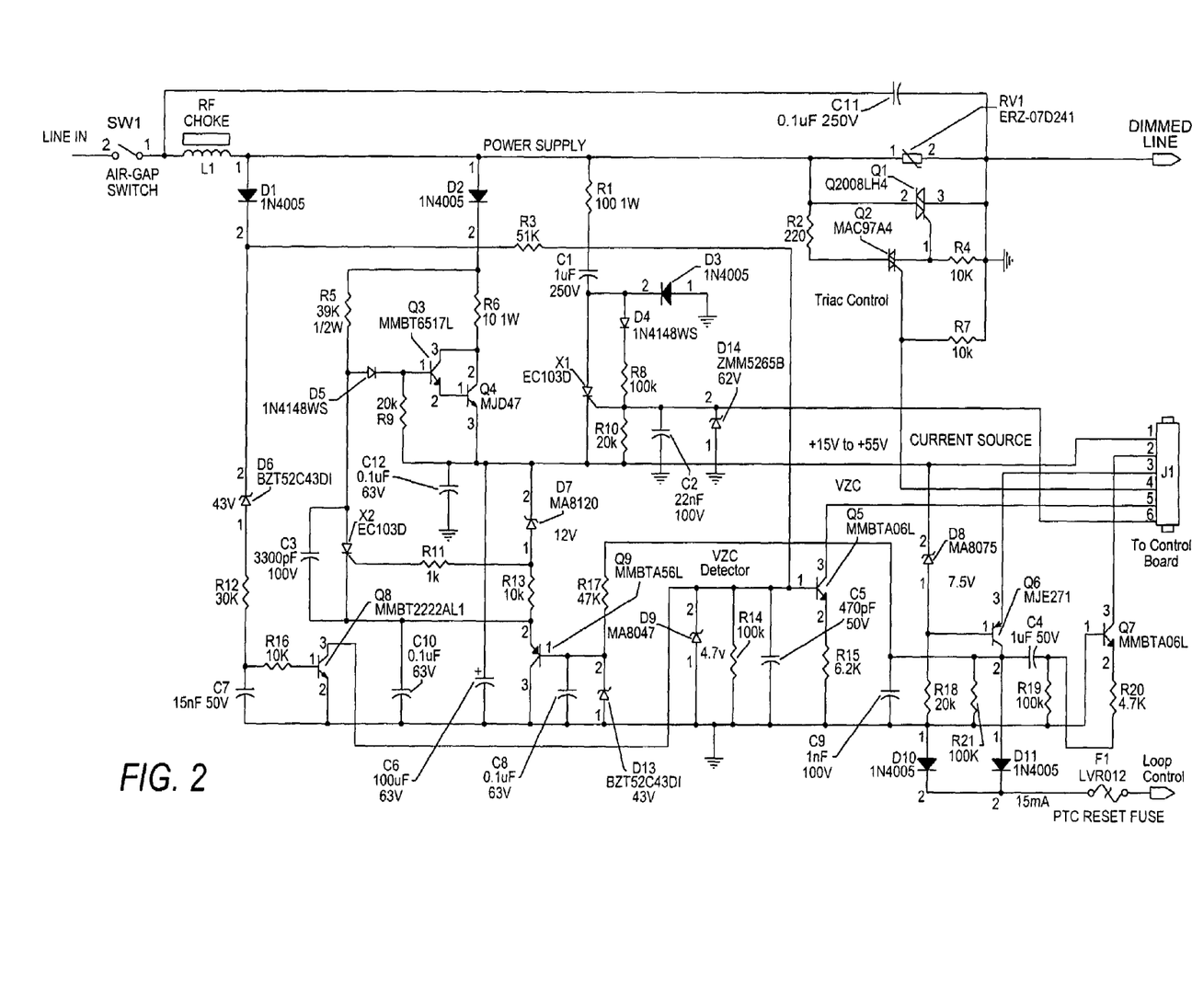
FIG. 2 is a circuit diagram of the power circuit for the dimmer control system of the invention.

Referring to FIG. 2, the Power Board circuit of the master unit is connected in series with the load, with a LINE IN terminal attached to a power line and a DIMMED LINE terminal connected to the load. The system does not require a neutral connection. The Power Supply consists of a switched power supply formed around darlington pair Q3 and Q4 for normal LOAD ON operation, in tandem with a capacitive power supply formed around capacitor C1 for LOAD OFF conditions. The Power Board circuit also provides a Current Source for the LOOP CONTROL to the remote units formed around transistor Q6. The remote units are connected in series with each other, with the first remote unit connected between the LOOP CONTROL terminal of the Master Unit and the next remote unit, and the last remote unit connected between the previous remote unit and the DIMMED LINE terminal of the master unit. Thus, all remote units are connected in a loop between the DIMMED LINE and LOOP CONTROL terminals of the master unit. The Power Board circuit of the master unit is interconnected to the Control Board circuit by interconnection through a 6-pin header J1.

Figure 3:
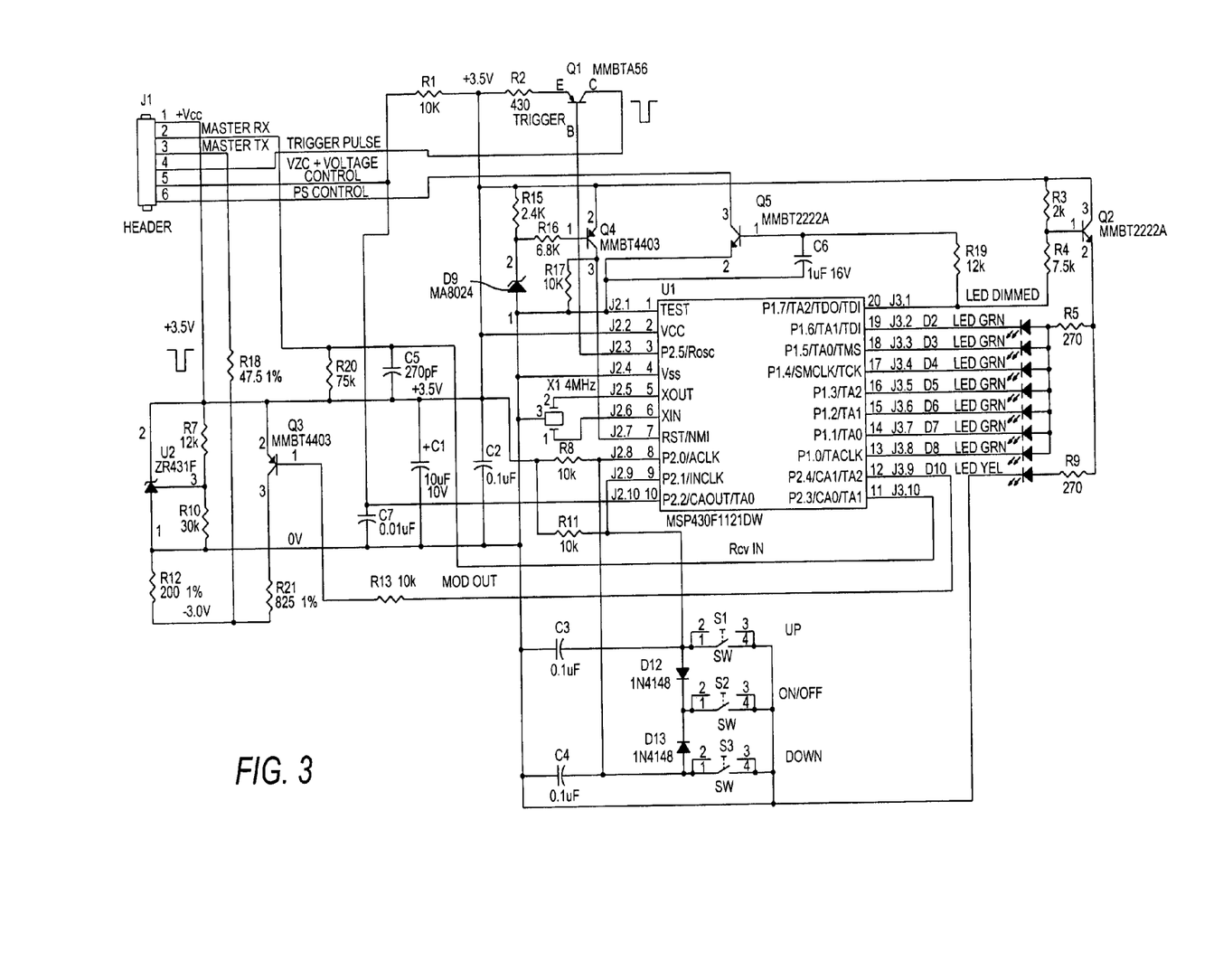
FIG. 3 is a circuit diagram of the master unit's control circuit for the dimmer control system of the invention.

Referring to FIG. 3, the Control Board circuit of the master unit is interconnected via header J1 with the Power Board's circuit. The Control Board circuit comprises a micro-controller U1, three push-buttons (UP, ON/OFF, and DOWN), and a switchable current source built around transistor Q1 to control the gate of the triac switch Q1 on the Power Board. When the switchable current source receives a control signal from the micro-controller U1, it generates gate current for the triac switch Q1 on the Power Board. The triac switch is then conducting and allows power to be conducted from the source to the load until the end of the half-cycle. When the control circuit is not producing a control signal, the triac is not conducting. Of the three push-buttons, the UP and DOWN buttons are formed by opposite ends of a rocker switch on the actual unit, and are used to gradually increase and decrease the power delivered to the load, respectively, and to change the preset level when the load is OFF, when the buttons are pressed. The ON/OFF button is used to commence a preprogrammed fade from ON to OFF or from OFF to ON depending on the current state and the user input. All fades are caused by the micro-controller sending control signals to either increase or decrease the amount of time the triac switch is conducting per cycle of the input AC waveform, thus controlling the percentage (from 0–95%) of the AC waveform that is conducted from the source to the load. Therefore, the Smart Dimmer uses phase control to deliver power to the load in pulses, such that the duration of the pulses determines the power level.

Figure 4:
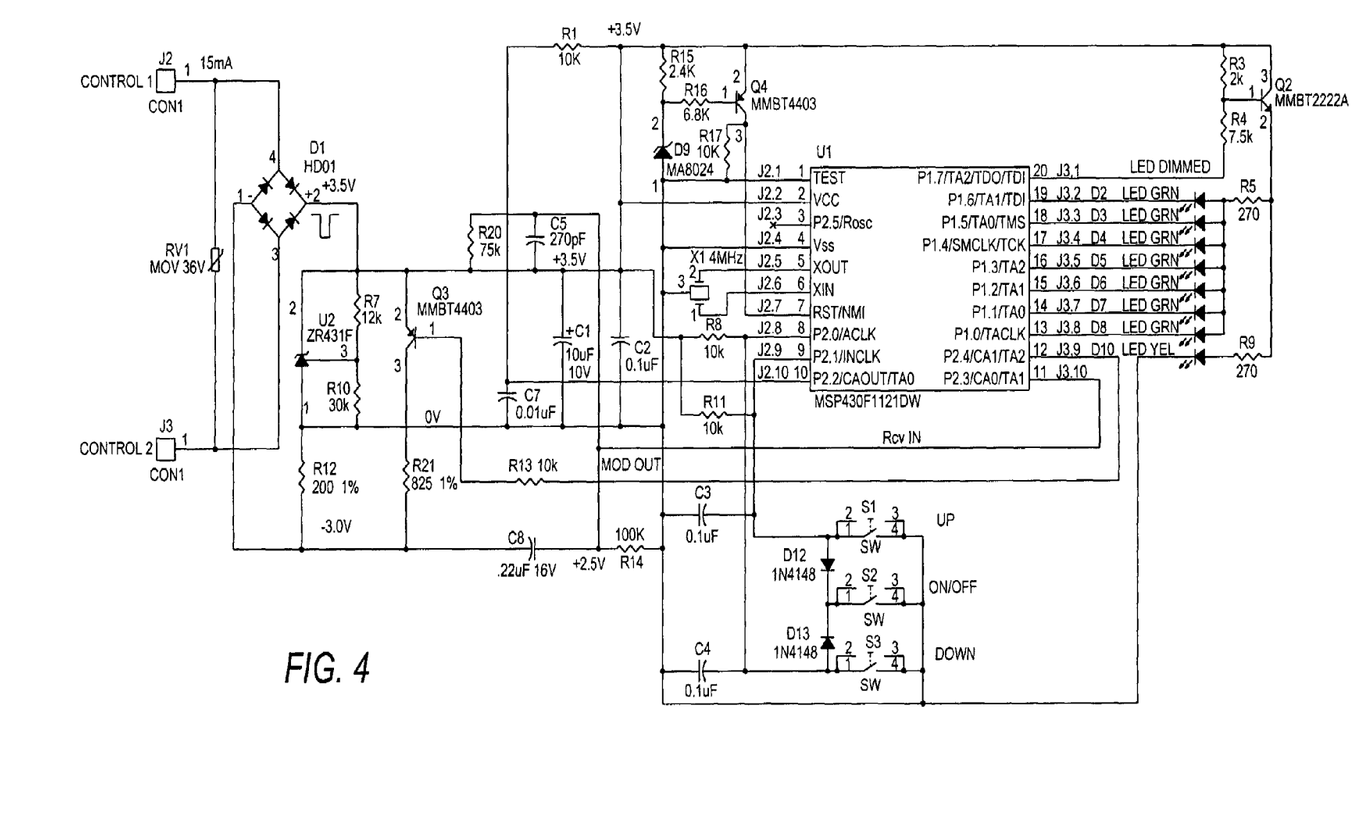
FIG. 4 is a circuit diagram of the remote control circuit for the dimmer control system of the invention.

Referring to FIG. 4, each of the remote units contains a similar Control Board with micro-controller U1 as used in the master unit, but do not contain the Power Board. The Control Board in the remote units is used mainly to receive commands from the master unit, and to display the lighting level status accordingly. The remote unit's Control Board is also used to generate the UP, DOWN and ON/OFF switch commands, which are encoded in loop voltage fluctuations and decoded as a digital sequence by the master unit, when the corresponding switches are actuated. The remote units do not store any information regarding the triac switch's firing angle or ON/OFF status.

Floating Reference Voltage for Control Circuits & Communication Loop

The loop current generated by the current source Q6 (FIG. 2) produces some voltage drop across the control loop. This voltage drop is proportional to a number of remote units in the loop. It also includes the voltage drop produced by wiring itself. The resulting voltage drop including the voltage drop across a protection diode D11 applies to the collector of Q6. After passing through a low pass filter R17, C8, the voltage applies to the base of Q9 (FIG. 2) that is configured in an emitter-follower arrangement and provides a voltage-following effect. The emitter voltage of Q9 follows the base voltage, while keeping the emitter at about 0.6V higher level than the base. The low impedance of the emitter Q9 makes it a reference point for the power supply. The regulation process of the power supply is described below.

When the Load is on, with every positive half cycle of the power line when the momentary voltage gets higher than the rail voltage, the Darlington transistor Q3Q4 starts conducting. The capacitor C6 gets charged through the load resistance and D2, R6 and Q4. When the voltage on C6 goes above the sum of the reference voltage at the base of Q9 and the Zener diode D7 voltage, the diode D7 breaks over, and passes the current through the gate of the SCR X2. The SCR starts conducting, and shunts the Darlington Q3Q4 base current. The Darlington Q3Q4 stops conducting, and the capacitor C6 starts discharging through the current source Q6. The cycle repeats every positive half cycle of the power line. Even if the condition of the control loop changes, the rail voltage (voltage on C6) is always kept at about 13v above the control loop voltage drop. The rail voltage in this circuit can range from +13v to +55v depending upon the number of remote units and conditions in the communication control loop.

The communication pulses and noise do not affect the rail voltage due to the low-pass filter R17, C8. The maximum rail voltage is limited by a Zener diode D13.

When the Load is off, the capacitive power supply output voltage is regulated by the Zener D7, and the gate-to-cathode voltage of the SCR X2. The resulting rail voltage is about 2V higher due to the voltage drop across R11, which is needed to automatically turn the switching supply off. The maximum rail voltage in this case is limited by Zener D14.

Circuit Operation of Master/Remote Communication

Communication in the Smart Dimmer system is achieved by transmitting encoded current fluctuations from the master unit to all the remote units, and transmitting a message encoded in voltage fluctuations from a remote to the master unit whenever the remote is actuated. The procedures for sending the communication messages are described below.

For communications from the master unit, the master unit Control Board manipulates the Current Source to modulate the loop current. The loop current passes through every remote and is detected as a dropout voltage across the resistor R in every remote. The loop current modulation thus results in the resistor R dropout voltage change, which is picked up and decoded as a digital message by the microprocessor in each remote's Control Circuit. The digital message from the master unit contains information that enables the remote's microprocessor to retrieve the display information to implement the corresponding LED display brightness and series lighting pattern, thus synchronizing the LED displays in the master unit and the remote units.

Referring to the master unit Power Board circuit in FIG. 2, the current source Q6 supplies current for the system operation. The same current powers all the remote units in the loop, as well as the Control Board of the master unit. Thus, the total current drawn from the Power Supply is minimized and independent of the number of remote units in the loop. An added benefit of this solution is a very good power supply ripple rejection. When no communication is required, the communication loop is powered by a constant DC current. The base of Q6 is fixed at −7.5V off the power rail. The emitter of Q6 is connected through the resistors R12, R18 in FIG. 3 and a controlled Zener diode U2 to the same power rail through interconnect Pin 1 of the header J1. This results in the Q6 emitter current of about 12 mA. This DC current powers the Control Board circuitry, and the operation voltage of 3.5V is stabilized by the controlled Zener diode U2. Assuming Q6 is a high gain Darlington transistor, its collector current is very close to 12 mA also. This current flows through the control loop and powers all the remote units. It passes through a diode bridge D1 in the remote's Control Board, which makes the remote units unidirectional, and it drops 3.5V required for the remote circuitry operation on a controlled Zener diode U2 (FIG. 4). After that it passes through a resistor R12 and back to the loop through the diode bridge D1.

The DC current level is considered a low logic level (logic "0") in the downstream communication from the master unit to the remote units in the loop. To transmit a high (logic "1") logic level, output pin 12 of the MPU U1 (FIG. 3) on the master unit Control Board goes low, and turns a switch Q3 on. This results in a loop current increase by about 5 mA. The loop current increase results in the R12 voltage drop increase of about 1V in every remote in the loop (FIG. 4). This voltage drop change goes through the DC blocking capacitor C8 into input Pin 11 of the MPU U1. This input is configured as an analog comparator input. Resistors R14, R20 provide a DC bias about 0.5V above the internal reference voltage of the analog comparator. Thus the comparator converts the transitions of the voltage drop across R12 into a digital sequence further processed by the CPU.

When a Remote button is actuated, the Control Circuit of the remote manipulates the switch SW to modulate the voltage drop across the remote. This modulation is picked up and decoded by the master unit. The message from the remote contains information about which button has been actuated on the remote. With the DC loop current, the Control Loop exhibits a certain voltage drop that is a sum of the voltages drop across every remote in the loop and the wiring voltage drop. The loop voltage drop under no communication conditions is considered a low logic level (logic "0") in the upstream communication from the remote units in the loop to the master unit. To transmit a high (logic "1") logic level, output pin 12 of the MPU U1 (FIG. 4) in the remote goes low, and turns a switch Q3 on. This results in a decrease of the voltage drop across this remote and the whole loop by about 1V. This transition is applied to the collector of Q6 (FIG. 2), and goes as a negative polarity pulse through the DC blocking capacitor C4. This pulse applies to the emitter of Q7 through the resistor R20, and generates a current pulse at the collector of Q7. This current pulse flows from the power rail through R20 (FIG. 3) into the collector of Q7 (FIG. 2), and generates a voltage drop on the resistor R20 (FIG. 3), which is sensed by input Pin11 of the MPU U1. This input is configured as an analog comparator input. The comparator converts the transitions of the voltage drop across R20 into a digital sequence further processed by the MPU as remote button activation information.

Figure 6:
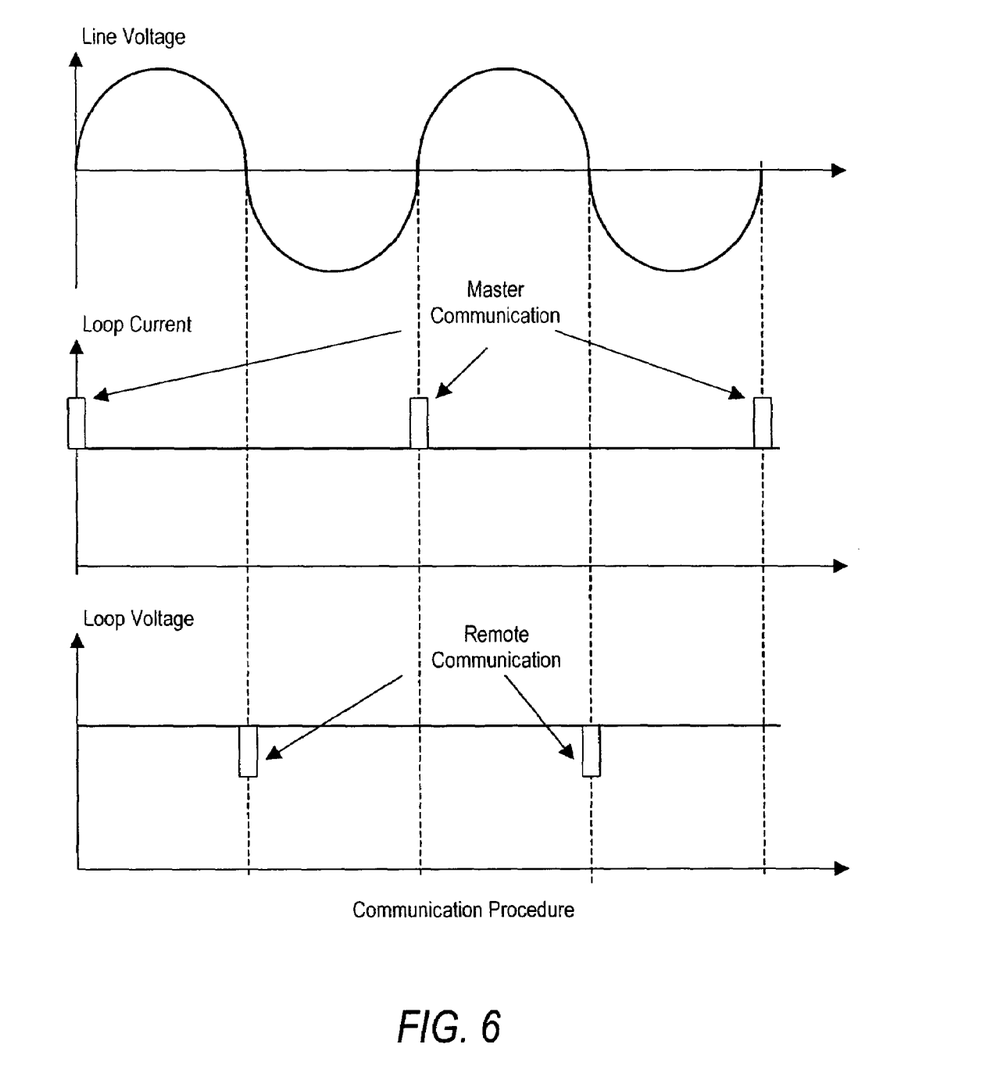
FIG. 6 shows timing diagrams illustrating the communication procedure of master unit communication and remote unit communication in relation to the timing of the input line voltage.

The communication from the master unit is timed to occur close to the power line voltage zero crossings to minimize the effect of noise on data integrity. While the master unit is directly synchronized from the power line, the remote units use the master unit's message to synchronize their transmission. The diagram in FIG. 6 illustrates the communication procedure. At the beginning of every positive half cycle of the power input, the master unit transmits a communication decoded as a digital message to the remote units in the Control Loop. The transmission occurs quite close to the voltage zero crossing to minimize power line noise effect on the communication. The message contains information about the pattern and brightness of the master unit's LED display. Remote units receive the message and adjust their LED displays accordingly. Every message from the master unit begins with a start bit. Remote units recognize this bit as the beginning of the frame, and use it to start a software timer that places a response message, if any, close to the next voltage zero crossing (at the half cycle). The response message is generated only if any of the buttons on the remote is actuated. If the message does not match the frame size or is not recognized by a remote, it is rejected. As the response messages from the remote units are synchronized with the master unit's transmission, the master unit uses gating to minimize noise effect on the received signal integrity. The received message is accepted only within a predetermined time frame. If the message does not match the frame size or is not recognized by the master unit, it is rejected. The gating technique is essential for the upstream communication, because it is received at a high impedance node represented by the output of the current source. The downstream communication is much less sensitive to the noise, as the remote's impedance is quite low.

When two or more remote units get actuated at the same time, they produce synchronous messages for the master unit. If the same button of the remote units is actuated the amplitude of the communication signal is increased. That will cause a larger current pulse through the resistor R20 (FIG. 3). In this case the amplitude of the pulse at Pin 11 of the MPU U1 will be limited by the MPU's internal input protection diodes, and the message will be accepted by the master unit. The message structure is designed such that, if different buttons of two or more remote units are actuated, the resulting combination message will not be recognized by the master unit, and will be rejected.

The power level indicated by the LEDs of the control units are not operated directly by the power supply. The power supply (either capacitive or switching) maintains a voltage level on the power rail with respect to the common conductor. This voltage is converted to constant current by the current source based on Q6 (FIG. 2) as explained earlier. Almost the same current flows in the emitter and collector circuits of the Q6. The collector current is being used to power the remote units control circuit board (if any of them are used). The emitter current is used to power the master unit's control circuit board.

As the remote and master unit control circuit boards operate the same way, the following description explains the LED operation with reference to FIG. 3. The current generated by the current source flows from J1 Pin1 (connected to the power rail on the master unit power board) through a controlled zener U2 and resistors R12, R18 to J1 Pin3, which is connected to the emitter of Q5 on the master unit power board. The 3.5V developed across U2 is used to power the control board circuitry. There are 7 green and one yellow LED on the control board. The yellow LED is always on. It is powered through a voltage regulator Q2, and a current limiting resistor R9. The green LEDs are powered through the voltage regulator Q2 and a current limiting resistor R5. The green LEDs are switched on and off by the MPU U1. Only one of the 7 green LEDs is on at a time. Brightness of the LEDs is defined by the status of Pin20 of the CPU U1. When the level on Pin20 is high the LEDs are bright, when the level is low, the LEDs are dim. The status of the LEDs (which one is lit, and its brightness) is defined by a 8-bit digital word loaded into Port1 of the MPU U1 configured as an output. The word is calculated by a subroutine based on the projected firing angle of the main triac and the value of the Light On flag in the Status register for the master unit unit. The same word is derived from the communication signal for the remote(s). The Light On flag indicates that the triac control signal generation is allowed. It does not coincide, though, with the triac control signal per se. In the same way, the Pin20 status change does not coincide in time with the Light On flag change. Pin20 of the MPU has no electrical connection with the triac control circuitry and cannot be used to assess the status of the load. Pin20 controls the base of the transistor Q5 on the control board, which in turn generates the control signal for the gate of X1 on the power board to switch the capacitive power supply on and off as discussed above.

Switched/Capacitive Power Supply

Due to the fact that the Smart Dimmer System components are connected in series the Power Supply has to produce the rail voltage sufficiently high to accommodate the voltage drop across all the components. In the meantime, the output current required to power the control circuit is low and does not change with the number of remote units used in the system. The trade-off "higher voltage vs. lower current" is favorable, as the circuit does not generate much heat while dropping the line voltage to the desired level.

The Smart Dimmer system features two power supplies located on the Power Board of the master unit. These power supplies are a switching one and a capacitive one. The power from the source is derived through the load. In the Power Board circuit diagram in FIG. 2, the switching power supply consists of a solid-state switch—Darlington Q3 and Q4 and associated circuitry. It operates only during a short period of time at the beginning of a positive half cycle of the power line voltage. This voltage is applied through D2 and R5 to the anode of D5. When the momentary voltage builds up, and gets above the DC level on the positive lead of the reservoir capacitor C6 (referred to herein as "the power rail"), the diode D5 starts conducting and Darlington Q3-Q4 goes into saturation. The power line current limited by the load impedance and a resistor R6 starts charging the capacitor C6. When the voltage on C6 exceeds the sum of a reference voltage on the emitter of Q9 and the breakover voltage of the zener diode D7, the diode D7 breaks over and passes current through to the gate of an SCR X2. As the SCR X2 starts conducting, the voltage on the anode of D5 drops below the rail voltage, D5 stops conducting, and the Darlington Q3-Q4 turns off. From this moment and to the beginning of the next positive half cycle, the capacitor C6 is being linearly discharged by a current source built around a PNP transistor Q6. Then the whole cycle repeats.

The base of Q9 is connected to the output of the current source built around Q6 in such way that it senses the total voltage drop of all remote units and wiring in the communication loop. Transistor Q9 is connected in an emitter follower configuration. The voltage on the emitter of Q9 follows the sensed voltage drop in the communication loop. As this circuit node exhibits very low impedance, it represents a floating voltage reference point for the power supply. Thus, the rail voltage is always set about 13V higher than the communication loop voltage drop.

The capacitive power supply includes a voltage drop capacitor C1, current limiting resistor R1, discharge diode D3, an SCR X1, and a corresponding circuitry. When a control signal is received from the Control Board (LOAD OFF condition), the capacitive power supply starts working as follows. The positive half cycle of the power line voltage passes through R1 and C1. When the momentary line voltage exceeds the power rail voltage, with D3 reverse biased, the current flows through D4 and R8 to the gate of X1. X1 starts conducting and charges C6 to a level somewhat higher than would be developed by the switching power supply. This level is defined by the value of C1 and a total circuit current consumption, which is constant in this design. As the capacitor C6 charges up, the zener diode D7 breaks over, and X2 turns on. This prevents Q3-Q4 from turning on when the capacitive power supply is operational. When the momentary voltage of the positive half cycle goes down below the rail voltage, X1 turns off, C1 gets discharged by the negative half cycle, which goes through R1, C1, and the forward biased D3. The operation repeats for every power line cycle.

When the control signal on Pin6 of J1 goes about −3v below the power rail voltage, X1 does not turn on, and the switching power supply resumes operation. This control signal is used to switch the capacitive power supply on when the load is not energized, and the "silent" operation of the circuit is desired. When the load is on, the current limiting resistor R1 of the capacitive power supply would generate significant amount of heat. That is why the capacitive power supply is used when the load is off, and the switching one is used when the load is on.

In the master unit Control Board circuit diagram depicted in FIG. 3, when Pin 20 of the microcontroller U1 is at logical "0" (low level), the transistor Q5 is not conducting. The collector of Q5 exhibits high impedance. The SCR X1 on the power board turns on at every positive half cycle, as explained above, and the capacitive power supply is operational. The Smart Dimmer system thus operates in a "silent mode". When Pin 20 of the microcontroller U1 goes to logical "1" (high level), the transistor Q5 starts conducting and connects the gate of the SCR X1 (Pin6 of J1) to the common point of the Control Board, which is about 3V below the power rail voltage. This stops the capacitive power supply, and resumes the switching power supply operation.

Power Interruption Memory

The master unit also includes a power interruption detection circuit and system memory for saving and then restoring the system's power level to the load after a power interruption to the level in effect immediately prior to the power interruption. During regular operation, the micro-controller identifies the power level as a 16-bit binary number and regularly stores that number in the micro-controller's RAM. The binary number represents the time delay for switching on the main triac Q1 on the Power Board which determines a percentage of the input AC power delivered to the load. When the source power is interrupted (i.e., when no further zero crossing of the AC input power is detected as a power cut-off by the micro-controller), the reservoir capacitor of the Power Supply supplies enough power to enable the micro-controller to store the latest binary number from RAM into its flash (non-volatile) memory. Thereafter, no power needs to be supplied to the micro-controller until the main power source is restored. The micro-controller's flash memory is static, non-volatile and requires no power (and therefore no auxiliary power source) to maintain the stored binary number in flash memory. When source power is restored to the micro-controller, the binary number is recalled from flash memory to RAM, calculations are performed to determine the last power level, and the micro-controller gates the triac Q1 (FIG. 2) at the appropriate delay times from zero crossings along the source AC waveform to restore the power level to the level prior to the power interruption.

In this manner, the system status information prior to power interruption is stored in the microcontroller's internal non-volatile memory (or an external memory chip) only when a power interruption has been detected. This avoids constant writing of the status information into non-volatile memory, which can cause the memory to fail after repeated writings exceed its service life. By using the energy accumulated in the reservoir capacitor to power the recording process, the need for an auxiliary power supply is avoided.

It is understood that many modifications and variations may be devised given the above description of the principles of the invention. It is intended that all such modifications and variations be considered as within the spirit and scope of this invention, as defined in the following claims.

I claim:

1. A dimmer control system for controlling power supplied to a load comprising:
    (a) a master unit connected in a communication control loop in series with one or more remote units, wherein said master and remote units each have a power level display for displaying a power level to be supplied by the system to the load, and control unit circuitry to allow two-way communication between the master unit and the remote units of the power level;
    (b) a dimmer load line supplying power to the load, wherein said communication control loop is superimposed in series on the dimmer load line; and
    (c) said communication control loop having a first encoding circuit for encoding communication messages by a first encoding method for transmission from the master unit to be decoded by the remote units in order to update the power level display of the remote units for the power level to be supplied by the system to the load, and a second encoding circuit for encoding communication messages by a second encoding method different from the first encoding method for transmission from any remote unit to be decoded by the master unit in order to set the power level to be supplied by the system to the load in accordance with user input entered on any of the remote units.

2. A dimmer control system according to claim 1, wherein one encoding circuit encodes the communication messages in loop voltage fluctuations, and the other encoding circuit encodes the communication messages in loop current fluctuations.

3. A dimmer control system according to claim 1, wherein said master unit circuitry includes an associated non-volatile memory and circuitry for detecting when the AC power line input has been interrupted representing a POWER OFF condition, and for immediately initiating a procedure for writing in the non-volatile memory information representing the status of the system prior to the power interruption, including the power level in effect prior to the power interruption, said system status information being retrieved from the non-volatile memory upon restoration of a POWER ON condition and being used to set the power level to be supplied to the load in accordance with the power level in effect prior to the power interruption.

4. A dimmer control system according to claim 1, wherein the power level display representing a desired power level to be supplied to the load can be adjusted without changing the power level actually supplied to the load when the system is in a LOAD OFF condition.

5. A dimmer control system according to claim 1, wherein the master unit circuitry has a current source which supplies control loop current which passes through all the remote units in series on the communication control loop, and the master unit causes current fluctuations in said current source current so as to encode communication messages in loop current fluctuations.

6. A dimmer control system according to claim 5, wherein said remote units each have a control circuit with a resistor which detects the loop current fluctuations as voltage changes across said resistor and decodes them as logical highs and lows of a corresponding digital message.

7. A dimmer control system according to claim 1, wherein the control unit circuitry of each of the remote units has a switch that changes a voltage drop across the remote units and causes voltage fluctuations in the control loop so as to encode communication messages in loop voltage fluctuations.

8. A dimmer control system according to claim 7, wherein the loop voltage fluctuations generated by a remote unit are passed to the master unit which detects the loop voltage fluctuations and decodes them as logical highs and lows of a corresponding digital message.

9. A dimmer control system according to claim 1, wherein the communication control loop is hosted and synchronized by the master unit and communication messages are transmitted by the master unit close to a start of each positive half cycle of input line voltage in order to minimize the effects of noise.

10. A dimmer control system according to claim 9, wherein the communication messages are transmitted by any of the remote units close to a start of each negative half cycle of input line voltage, and the master unit uses time gating of the communication messages in order to minimize the effects of noise.

11. A dimmer control system according to claim 1, wherein the communication control loop is hosted and synchronized by the master unit and communication messages are transmitted by the master unit close to a start of each negative half cycle of input line voltage in order to minimize the effects of noise.

12. A dimmer control system according to claim 11, wherein the communication messages are transmitted by any of the remote units close to a start of each positive half cycle of input line voltage, and the master unit uses time gating of the communication messages in order to minimize the effects of noise.

13. A dimmer control system according to claim 1, wherein said master unit circuitry includes a phase-regulated AC switch which is switched on by a switching signal timed at a given time delay from the start of each half-cycle of an AC power line input in order to supply power to the load at a power level determined by the given time delay, wherein said time delay corresponds to the power level indicated by user input to the master or remote units to be supplied to the load.

14. A dimmer control system according to claim 13, wherein the time delay for the load's current power level is identified as a 16-bit binary number by a microprocessor of the master unit circuitry and is regularly stored in the microprocessor's RAM, and the binary number is retrieved from RAM and written to the non-volatile memory only when a POWER OFF condition is detected.

15. A dimmer control system according to claim 14, wherein the microprocessor remains powered at the onset of a POWER OFF condition by a reservoir capacitor that charges during normal operation, and when power is interrupted, the reservoir capacitor supplies enough power to enable the microprocessor to store the last binary number from RAM into its non-volatile memory.

16. A dimmer control system according to claim 1, wherein said master unit has a power supply circuit provided with a switched power supply in tandem with a capacitive power supply, wherein the switched power supply is used during LOAD ON conditions in order to avoid heat generation that would be incurred by otherwise using the capacitive power supply, and the capacitive power supply is used during LOAD OFF conditions in order to avoid acoustic noise (hum) in the load.

17. A dimmer control system according to claim 16, wherein the switched power supply includes a solid-state switch and associated circuitry that operates during a switching period on each positive half cycle of an AC input line voltage, and the capacitive power supply includes a voltage drop capacitor, that provides rail voltage high enough to prevent the switched power supply's switch from turning on when the capacitive power supply is operational.

18. A dimmer control system according to claim 16, wherein the switched power supply includes a solid-state switch and associated circuitry that operates during a switching period on each negative half cycle of an AC input line voltage, and the capacitive power supply includes a voltage drop capacitor, that provides rail voltage high enough to prevent the switched power supply's switch from turning on when the capacitive power supply is operational.

19. A dimmer control system according to claim 16, wherein said master unit has a power supply circuit that provides an output rail voltage equal to the sum of a fixed reference voltage and a control loop voltage equivalent to the total voltage drop across the series-connected remote units.

20. A dimmer control system according to claim 16, wherein the power supply circuit of the master unit includes a current source that generates a DC current that flows through the remote units for operation of the remote units, and the total voltage drop across all the remote units in the communication control loop is sensed by the power supply circuit of the master unit and the DC rail voltage is self-adjusted by the power supply circuit accordingly.

21. A dimmer control system according to claim 16, wherein the self-adjustment by the power supply circuit of the master unit is performed by a transistor node connected in a voltage follower arrangement.

22. A dimmer control system for controlling power supplied to a load comprising:
(a) a master unit connected in a communication control loop in series with one or more remote units, wherein said master and remote units each have a power level display for displaying a current power level supplied by the system to the load, and control unit circuitry to allow two-way communication between the master unit and the remote units of the power level to be supplied to the load;

(b) a dimmer load line supplying power to the load, wherein said communication control loop is superimposed in series on the dimmer load line; and (c) said master unit has a power supply circuit that provides an output rail voltage equal to the sum of a total control loop voltage drop and a fixed reference voltage.

23. A dimmer control system according to claim 22, wherein said communication control loop has a first encoding circuit for encoding communication messages by a first encoding method for transmission from the master unit to be decoded by the remote units in order to update the power level displays of the remote units for the current power level supplied by the system to the load, and a second encoding circuit for encoding communication messages by a second encoding method different from the first encoding method for transmission from any remote unit to be decoded by the master unit in order to set the power level supplied by the system to the load in accordance with user input entered on any of the remote units.

24. A dimmer control system according to claim 22, wherein said power supply circuit is provided with a switched power supply in tandem with a capacitive power supply, wherein the switched power supply is used during LOAD ON conditions in order to avoid heat generation that would be incurred by otherwise using the capacitive power supply, and the capacitive power supply is used during LOAD OFF conditions in order to avoid acoustic noise (hum) in the load.

25. A dimmer control system according to claim 22, wherein said master unit circuitry includes a phase-regulated AC switch which is switched on by a switching signal timed at a given time delay from the start of each half-cycle of an AC power line input in order to supply power to the load at a power level determined by the given time delay, wherein said time delay corresponds to the power level indicated by user input to the master or remote units to be supplied to the load.

26. A dimmer control system according to claim 22, wherein said master unit circuitry includes an associated non-volatile memory and circuitry for detecting when the AC power line input has been interrupted representing a POWER OFF condition, and for immediately initiating a procedure for writing in the non-volatile memory information representing the status of the system prior to the power interruption, including the power level in effect prior to the power interruption, said system status information being retrieved from the non-volatile memory upon restoration of a POWER ON condition and being used to set the power level to be supplied to the load in accordance with the power level in effect prior to the power interruption.

27. A dimmer control system according to claim 22, wherein the power supply circuit of the master unit includes a current source that generates a DC current that flows through the remote units for operation of the remote units, and the total voltage drop across all the remote units in the communication control loop is sensed by the power supply circuit of the master unit and the DC rail voltage is self-adjusted by the power supply circuit accordingly.

28. A dimmer control system according to claim 27, wherein the self-adjustment by the power supply circuit of the master unit is performed by a transistor node connected in a voltage following arrangement.

\* \* \* \* \*